United States Patent [19]
Ellingson

[11] Patent Number: 6,149,701
[45] Date of Patent: Nov. 21, 2000

[54] VENT FILTER MODULE

[76] Inventor: Paul Ellingson, P.O. Box 45165, Madison, Wis. 53744

[21] Appl. No.: 09/268,157

[22] Filed: Mar. 15, 1999

[51] Int. Cl.[7] .................................................. B01D 25/00
[52] U.S. Cl. ........................... 55/493; 55/385.1; 55/494; 55/506; 55/511; 55/DIG. 36
[58] Field of Search ............................. 55/493, 494, 511, 55/DIG. 36, DIG. 31, 491, 490, 492, 501, 506, 508, 385.1

[56] References Cited

U.S. PATENT DOCUMENTS

| | | | |
|---|---|---|---|
| 3,047,994 | 8/1962 | Le Brun | 55/493 |
| 3,280,984 | 10/1966 | Sexton et al. | 55/491 |
| 3,854,912 | 12/1974 | Terrel et al. | 55/DIG. 36 |
| 4,610,705 | 9/1986 | Sarnosky et al. | 55/DIG. 36 |
| 4,801,316 | 1/1989 | Schroeder | 55/494 |
| 5,145,500 | 9/1992 | Nolen, Jr. | 55/DIG. 36 |
| 5,318,607 | 6/1994 | Malloy et al. | |
| 5,567,216 | 10/1996 | Mirza et al. | |
| 5,797,975 | 8/1998 | Davis | 55/493 |
| 5,800,588 | 9/1998 | Miller | 55/494 |
| 6,010,558 | 1/2000 | Ackland | 55/DIG. 36 |

*Primary Examiner*—David A. Simmons
*Assistant Examiner*—Minh-Chau T. Pham
*Attorney, Agent, or Firm*—Russell L. Johnson, Patent Agent

[57] ABSTRACT

A filter module is disclosed wherein the module has a three sided channel shaped water permeable frame member and a filter mat member which inserts into the frame to form a filter module which may serve as a filter element of a filter for materials discharged from cooking hood vents. The filter modules are interlocking and permit the in place fitting and assembly of the modules into filter assemblies around and/or under a cooking hood exhaust vent. The overlapping and interlocking elements of the modules provide a secure and readily serviced filter module assembly.

7 Claims, 4 Drawing Sheets

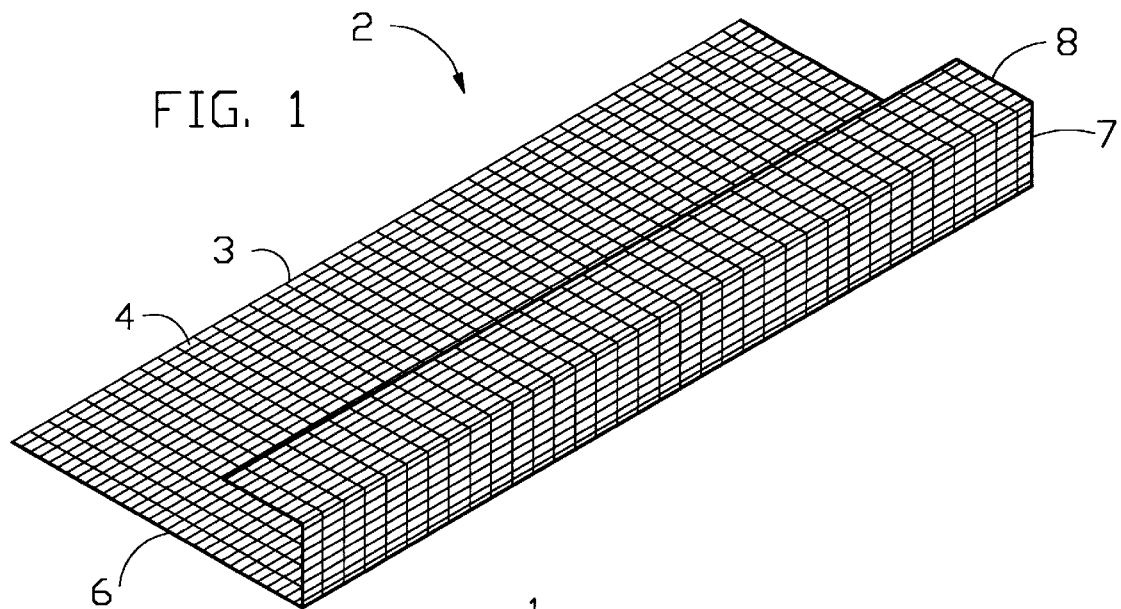
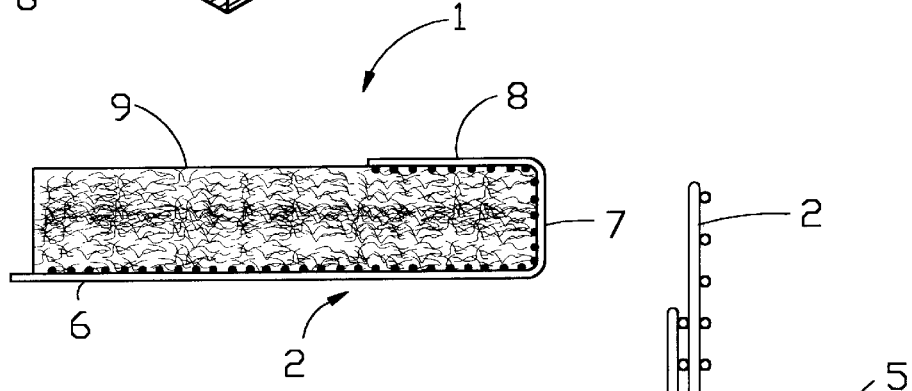
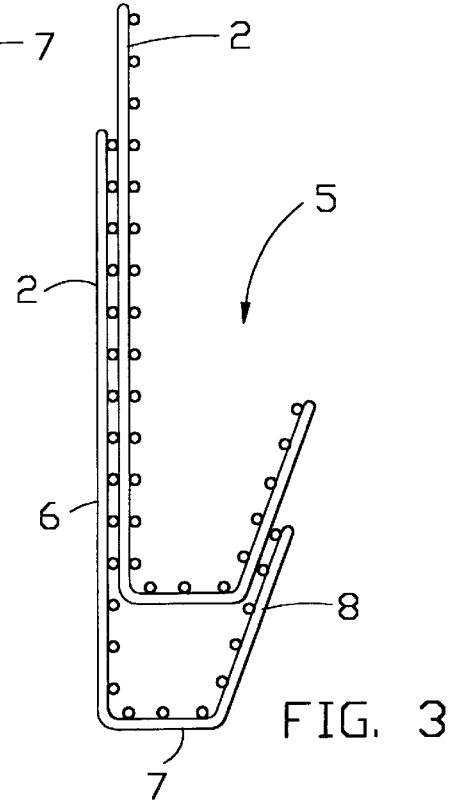

VENT FILTER MODULE

FIELD

This invention relates to guards for exhaust vents for volume cooking facilities.

More particularly, this invention relates to filtering guards that are placed below exhaust vents to intercept exhaust discharges that have entrained therein, particles, cooking oils and fats and to filter out the particles, oils and fats while letting water escape.

Still more particularly this invention relates to a frame module that can be interlocked with filter elements and other frame modules and filter elements to form vent guard assemblies.

BACKGROUND

Roof and wall vents for cooking hoods discharge fumes, smoke and vapors that arise from cooking. Even with condenser filters in the hood, the air vented from cooking hoods, contains some particles and vapors of fats and oils. These vapors condense or are propelled out of the housing of the exhaust and collect beneath the exhaust duct.

Accumulations of these materials turn rancid, develop odors, are washed away in rain runoff and become sanitation and environmental nuisances and can do damage to a roof or wall where they accumulate.

The art provides filters that trap particles, oils and fats while letting rain water pass through.

U.S Pat. 5,567,216 to Mirza et al. teaches a filter assembly that is a part of a support frame and built up of overlapping layers of filtering material around an exhaust duct.

U.S. Pat. 5,318,607 to Malloy et al. teaches a filter assembly built up of multiple mats of filter material having a square central aperture that fits over a roof vent and is supported by a frame.

Heretofore, the art has not provided a filter module whose components are nestable and cutable to provide a filter module that is assembleable and fitable in place to form an interlocked filter assembly that is readily assembled and disassembled.

BRIEF SUMMARY OF THE INVENTION

This invention is for a filter module that can be assembled in multiples to form filter guards around and beneath exhaust vents of commercial cooking facilities.

A module comprises a three sided water permeable frame having a rectangular base side, a rectangular upstanding side and a first long edge of the base side is joined with a first long edge of the upstanding side and a rectangular top side and a first long edge of the top side is joined to a second long edge of the upstanding side to form a channel that is nestable with a second frame of similar construction and an elongate rectangular filter which is insertable into said channel to form a filter module.

BRIEF DESCRIPTION OF THE DRAWINGS

FIG. 1 is a pictorial view of a frame structure for a filter module of this invention FIG. 2 is an end elevational view of the frame of FIG. 1 having a filter inserted therein.

FIG. 3 is an end elevational view of a number of frames of FIG. 1 nested together.

DETAILED DESCRIPTION OF THE INVENTION

Figure 4:
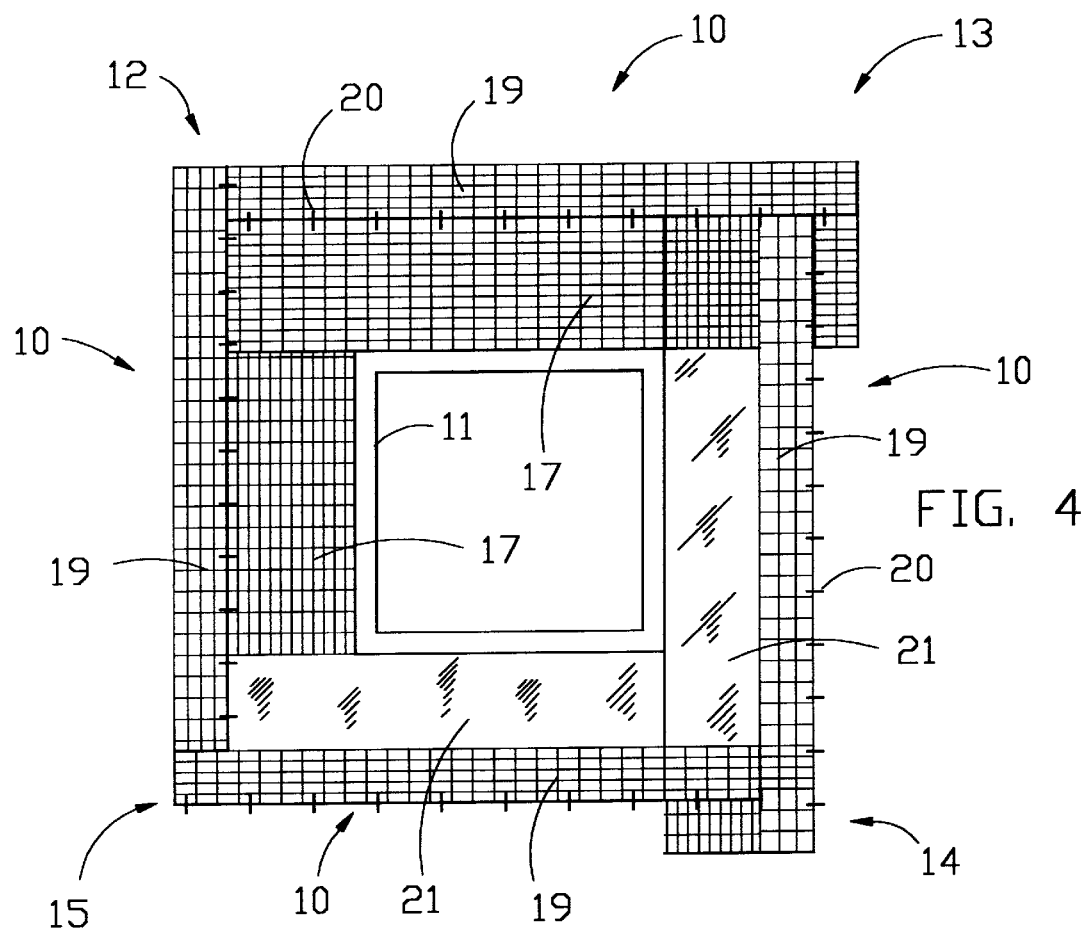
FIG. 4 is a plan view of a partially assembled filter assembly formed from modules made according to this invention.

In the drawings like numbers refer to like objects and the proportions of some elements of the drawings have been modified to facilitate illustration.

Referring now to FIGS. 1 through 3 wherein frame structure 2 is shown to be formed from a single sheet of welded wire mesh 3 having interstices 4 which are large enough to pass moderate sized particulate matter and congealed fats and oils. Frame structure 2 is formed to have three sides; a base side 6, an upstanding side 7, and a top side 8 which form a channel 5 into which a filter 9 is inserted as shown in FIG. 2.

Filter module 1 is normally placed with a broad surface facing up so that materials discharged from a hood exhaust will fall onto and be captured by filter 9. Filter 9 is typically a multilayered assemblage of natural and/or synthetic fibers configured so that solid particles and fatty globules will enter into and be entrapped by a relatively open and coarse upper layer, and oils and finer matter will migrate downward into a second oil absorbing and retaining layer while water passes downward and through a fine filtering layer that is a barrier to the passage of materials reaching this layer while still permitting filtered water to escape through the bottom layer of the filter.

Filter 9 is typically resilient such that when top side 8 is pressed towards base side 6 to pinch down on filter 9 portions of the surfaces of filter 9 are pressed into interstices 4 to form a mechanical engagement between the surfaces of filter 9 and interstices 4 of mesh 3.

Exhaust vents for cooking hoods are typically located on roofs or high up on walls. Filters placed under the vents will typically have dimensions of 4 feet by 4 feet and more. The benefits of storing and shipping filter module 1 nested and knocked down is also a benefit in carrying the modules to the installation sight and assembling them there.

Filter assemblies are usually maintained in position by frames or racks that support the filter assemblies while permitting water to escape freely from beneath the filter. Filter assemblies are built up on the frames from modules that are secured to the frames and to each other by wires or clips or other suitable fasteners.

Heretofore, filters were fitted and built onto or around or beneath an exhaust duct and required a considerable amount of assembly work to install and to change. In contradistinction, the filter assemblies of this invention are interlockable and require a minimal amount of on-sight assembly all of which can be accomplished with hand tools commonly carried by a workman on such jobs.

Figure 5:
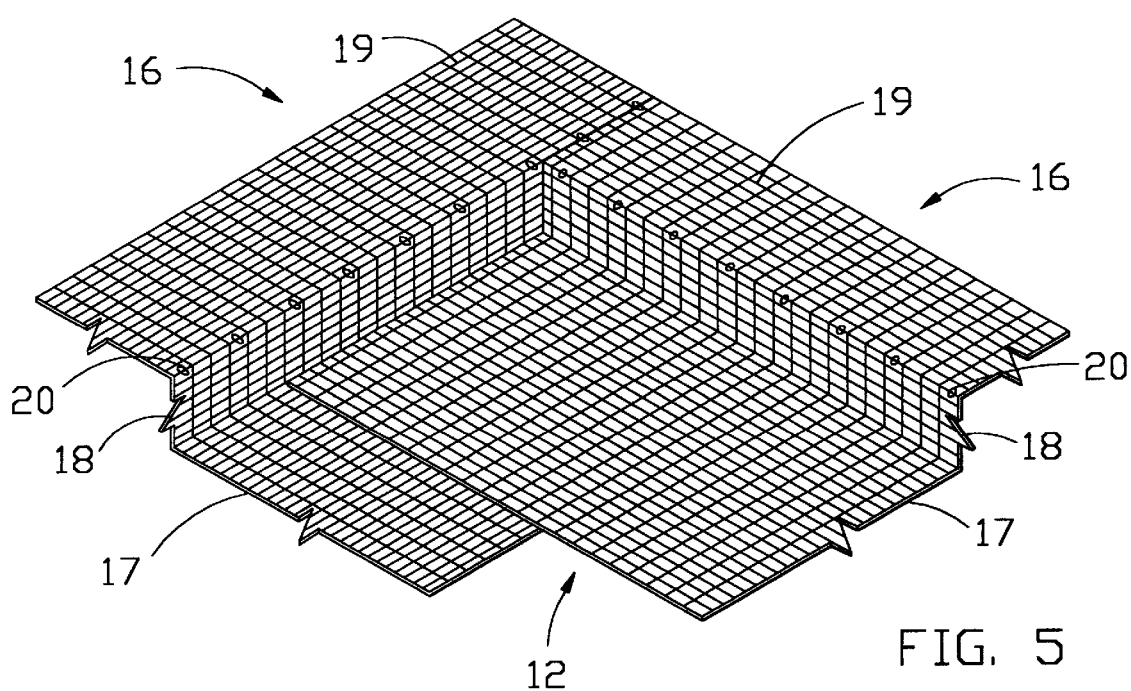
FIG. 5 is fragmentary pictorial view of a corner formed by two frames made according to this invention.

Referring now to FIGS. 4 and 5 wherein four modules 10 are shown as interlockingly assembled around exhaust vent 11. Exhaust vents, such as vent 11 are fitted to pass through roof structures and though many have dimensions in the order of 2 feet by 2 feet, there is an appreciable variance between roof vents. One consequence of this variability is the common practice of building and custom fitting a filter support and filter assembly on-sight around the exhaust duct. The filter modules of this assembly are free to adjustably overlap in one direction at each corner so that a filter assembly of modules 10 can accommodate to dimensional variability in vent 11 thereby eliminating the need for custom fitting.

In FIG. 5 corner 12 of a filter assembly using modules 10 is illustrated. Frame 16 has a rectangular base side 17 joined to an upstanding side 18 which is formed as a part thereof. Top side 19 is hingeably joined to upstanding side 18 by hinging means 20. Base side 17 of first frame 16 underlays base side 17 of second frame 16. Second frame 16 abuts upstanding side 18 of first frame 16 and is free to be moved along base side 17 and upstanding side 18. Each frame 16 has its base side 17 at one end underlaying a base side 17 of an adjacent frame member 16 and overlaying a base side 17 of an adjacent frame member 16 at the other end as illustrated at corners 12 and 13 of FIG. 4.

As can be seen at corners 13 and 14 of FIG. 4 when top side 19 is folded inward frame 16 may have excess material projecting from the corners. If this is the case the installer can cut away the excess with snips or cutters which are commonly found in such workman's tool pouch.

To create a filter assembly, frames 16 are first placed around vent 11 with one end overlaying an opposite end of an adjacent frame 16 as described above. Filter mats 21 are then cut to length and placed on base sides 16 so that the filter mat 21 rests along the length of one base side 17 and overlays the intersecting base side 17 at a corner as shown at corner 14 of FIG. 4. This construction provides an overlapping interlock which is strengthened by folding top side 19 inward to overlay filter mats 21 so as to bridge the seams between filter mats 21 and further interlock the construction.

Figure 6:
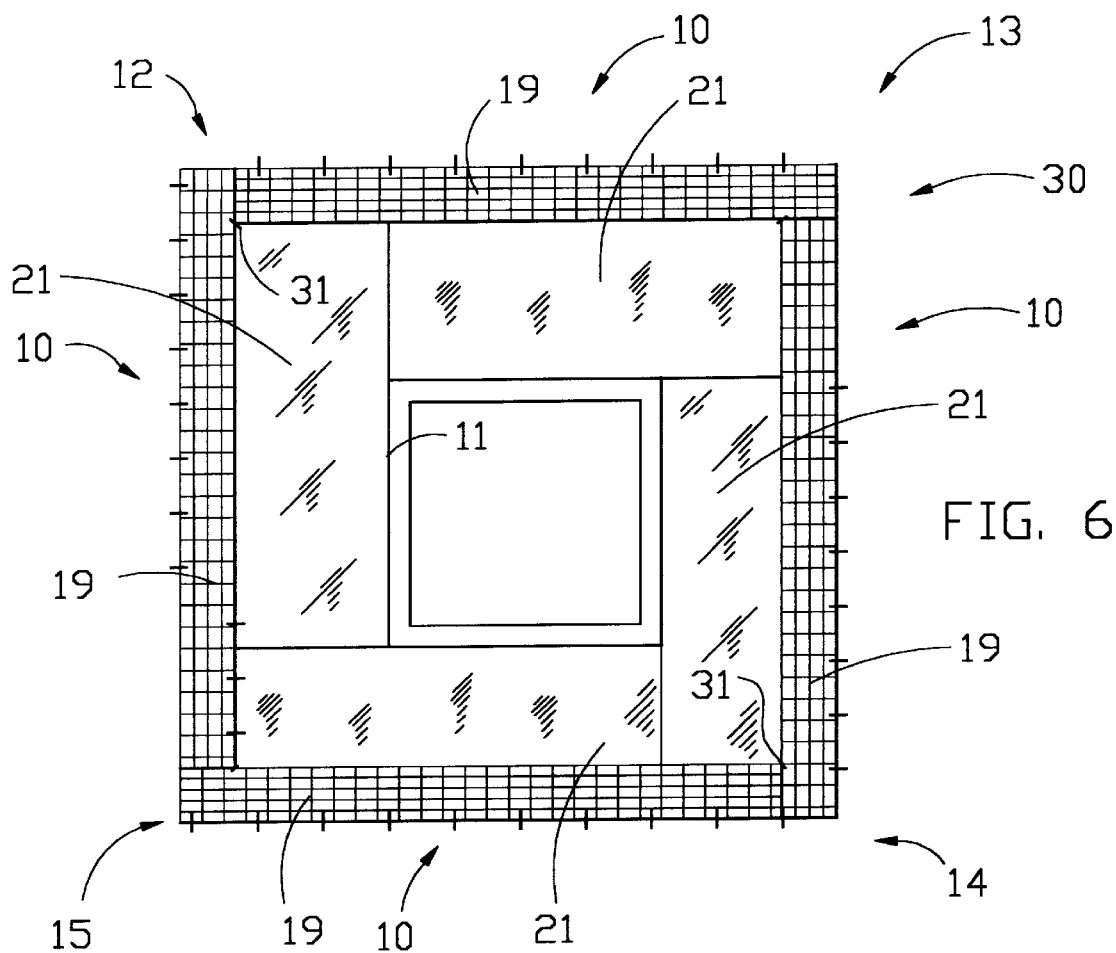
FIG. 6 is a plan view of a fully assembled filter assembly formed from modules made according to this invention.

Referring now to FIG. 6 which shows filter assembly 30 assembled from four filter modules 10 around vent 11. Filter mats 21 are locked in place by the interlocking of top sides 19 at the corners 12, 13, 14 and 15 much as the corners of a cardboard box are interlocked to form a releasable interlocking closure.

The above disclosures are enabling and would permit one skilled in the art to practice the invention in the best mode known to the inventor without undue experimentation.

However, the invention admits of modifications and variations that are within the scope of the invention but the full disclosure of the possible combinations would greatly multiply the claims and drawings and cause the specifications to become prolix. The following disclosures are representative of the modifications and variations of the invention that are within the scope of the invention.

A filter assembly of the sort disclosed above is usually supported above a roof surface by a frame which provides positioning, and support and to which the filter is secured and held down. A number of such positioning, supporting, and holding down means are in common usage and the filter assembly of this invention is compatible with most of them.

The size and shape of the filter assembly of this invention when placed around a roof vent or supported under a wall vent, exposes the filter assembly to wind loads and other forces that are of significant magnitude. The interlocking nature of the filter assemblies formed from the panel modules of this invention is secure in all but the most adverse of weather conditions. Additional securement of the filter assemblies can be had by coupling panels of one filter module to an adjacent filter module using conventional coupling means such as; commercial clips, hog rings, wire ties, spring clips and the like. Ring clip coupling means 31 is illustrated in FIG. 6 as joining top sides 19 at their intersections with adjacent top sides 19.

Figure 7:
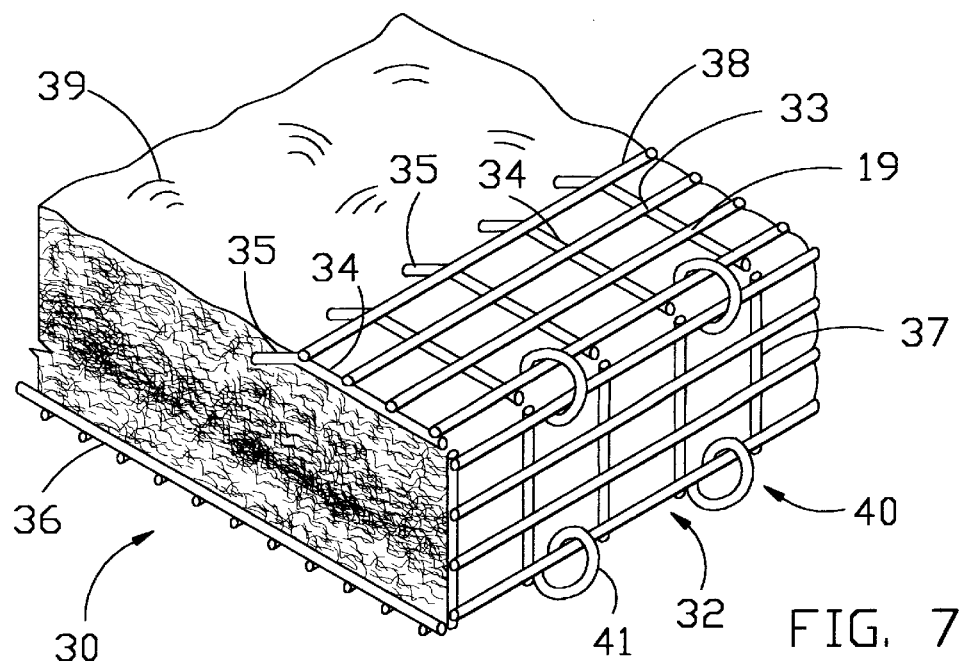
FIG. 7 is a fragmentary pictorial view of a preferred embodiment of the filter module of this invention.

Referring now to FIG. 7 wherein a preferred embodiment of the invention is illustrated. Frame 32 is formed of welded wire mesh 33 wherein a long edge of rectangular base side 36 is hingeably joined with a first long side of upstanding side 37 by hinging means 40 which is here shown as rings 41 and a long edge of top side 38 is hingeably joined with a second long edge of upstanding side 37 by hingeing means 40. A second long edge of top side 37 is cut so that transverse wires 34 project laterally from said second long side of top side 38 and ends 35 of transverse wires 34 are bent downward so that when top side 38 is folded inward onto filter 39, ends 35 of wires 34 embed in filter 39 and thereby adding to the interlocking of members of a filter module made according to this invention and/or an assembly of such modules.

Figure 8:
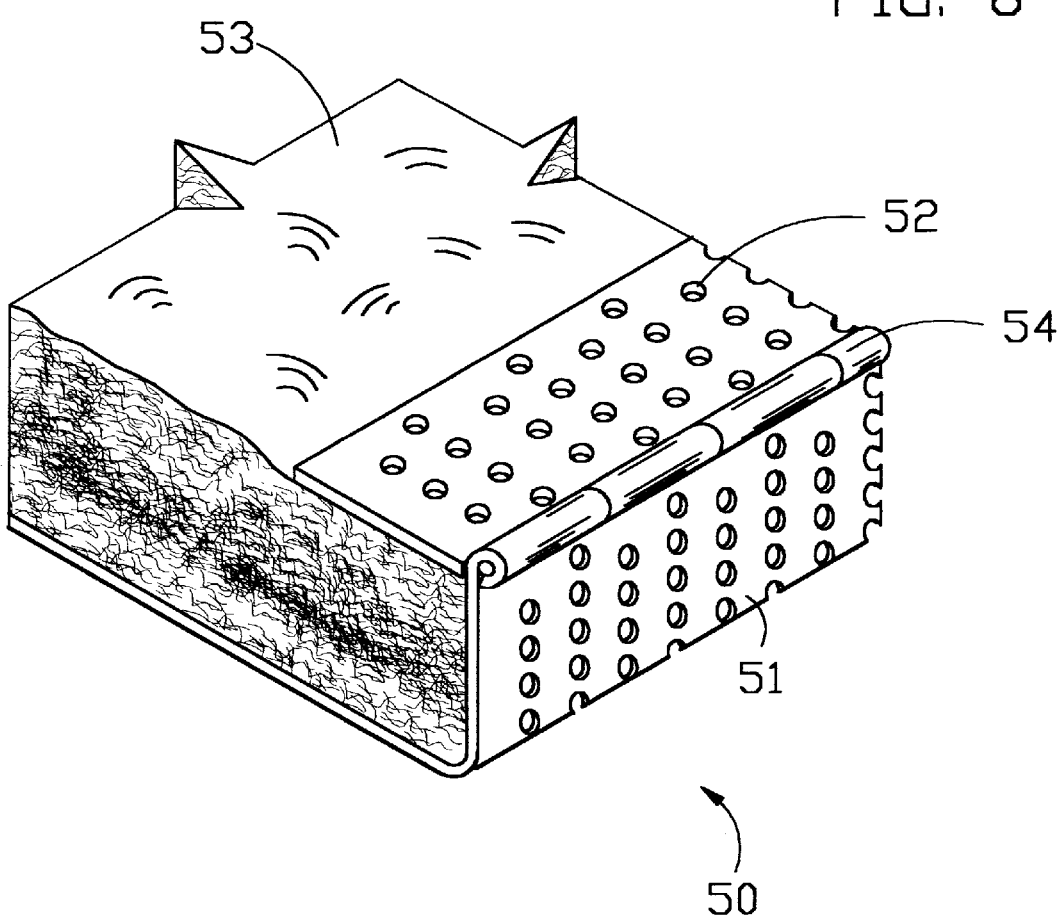
FIG. 8 is a fragmentary pictorial view of a second preferred embodiment of the filter module of this invention.

Referring now to FIG. 8 wherein a second preferred embodiment of the invention is illustrated. Frame 50 is formed of sheet material 51 having interstices 52 passing therethrough and interstacies 52 are of a size and quantity to permit the passage of particles and globules into filter mat 53 and the passage of water therethrough. Hinge means 54 is a pinned hinge.

As has been disclosed and illustrated above the frame component of this invention may be formed of a variety of materials and given a variety of configurations and the hinge means of this invention may be selected from a variety of hinge means and the nesting and/or stacking of a multiplicity of frame components can be accomplished in a variety of ways and the filter component of the module of this invention may be of a suitable construction to serve the end of retaining foreign matter and permitting the passage of water therethrough.

It should be understood that the scope of the invention should not be limited to the embodiments disclosed above but should only be limited to the scope of the appended claims and all equivalents thereto that would be made apparent to one skilled in the art.

What is claimed is:

1. A filter module comprising;

An elongate three sided water permeable channel shaped frame structure having;

1) a rectangular base side having a width and a length and the width is approximately that of the width of a filter to be supported thereon, 2) a rectangular upstanding side having a length and a height and the height is approximately that of the height of a filter to be engaged therewith, and a first long edge of the upstanding side is joined with a first long edge of the base side, and 3) a rectangular top side having a length and a width and the width of the top side is less than the width of the base side and a first long edge of the top side is joined with a second long edge of the upstanding side, and the frame structure is nestable with a second frame structure of similar construction, and an elongate rectangular filter having a width approximately the width of the base side of the frame and a height approximately the height of the upstanding side of the frame and the filter is insertable into said channel shaped frame.

2. The filter module of claim 1 wherein the frame is formed of a reticulated material and the second long edge of the upstanding side is hingeably joined with the first long edge of the top side by a multiplicity of ring hingeing means.

3. The filter module of claim 2 wherein the reticulated material is welded wire screen and the second long edge of the top side has a multiplicity of transverse wires projecting laterally therefrom each wire having a free end which is bent downward so that the free ends will enter and engage the filter when the top side is folded onto the filter.

4. The filter module of claim 1 wherein the channel shaped structure is formed of sheet material defining a multiplicity of closely spaced interstices and the top side is hingeably joined to the upstanding side by means of a pinned hinge.

5. A filter assembly formed of a multiplicity of the filter modules of claim 1 wherein the modules interlock.

6. A filter assembly formed of four filter modules assembled around a nominally square exhaust vent and comprising;
   a) four three sided elongate water permeable channel shaped frame structures, each structure having;
      1) a rectangular base side having a width and a length and the width is approximately that of the width of a filter to be supported thereon,
      2) a rectangular upstanding side having a length and a height and the height is approximately that of the height of a filter to be engaged therewith, and a first long edge of the upstanding side is joined with a first long edge of the base side, and
      3) a rectangular top side having a length and a width and the width of the top side is less than the width of the base side and a first long edge of the top side is joined with a second long edge of the upright side, and wherein,
   b) a base side of each of the four frame structures engage an adjacent frame structure at the ends of the base side so that a first end of the base side overlays an adjacent base side and at a second end the base side underlays an adjacent base side and the assembly forms a square frame having four overlapping corners around an exhaust vent,
   c) an elongate filter mat having a width approximately the width of the base side and the filter mat is laid along a base side so that at a corner the filter overlays the base side that overlays the base side along which the filter lays so as to create interlocking overlays at each corner,
   d) a top side that is folded over and pressed onto the filter mat so as to engage the top side with the filter mat so as to form an interlocking four sided filter assembly around the exhaust vent.

7. The filter assembly of claim 6 wherein each top side is interlocked with adjacent top sides by having a first end of a top side overlaying an end of an adjacent top side and a second end of the top side underlaying an end of an adjacent top side.

* * * * *